United States Patent [19]

Leibach

[11] 3,867,813
[45] Feb. 25, 1975

[54] TURBOJET ENGINE FOR VERTICAL OR SHORT TAKE-OFF AND LANDING AIRPLANES

[75] Inventor: Heinrich Leibach, Grafrath-Wildenroth, Germany

[73] Assignee: Motoren- und Turbinen-Union Munchen GmbH, Munich, Germany

[22] Filed: Oct. 5, 1972

[21] Appl. No.: 295,219

[30] Foreign Application Priority Data
Oct. 5, 1971 Germany............................ 2149619

[52] U.S. Cl. ................ 60/225, 60/226 R, 60/229, 60/263, 60/39.17, 60/39.33
[51] Int. Cl. ............................ F02k 3/04, F02c 3/06
[58] Field of Search ............ 60/39.18 C, 226 R, 229, 60/230, 225, 262, 39.33, 39.16 C, 39.16 R, 39.17, 263, 39.25; 244/23 A, 23 B, 23 D, 12 D

[56] References Cited
UNITED STATES PATENTS

| | | | |
|---|---|---|---|
| 2,504,181 | 4/1950 | Constant | 60/226 R |
| 2,528,635 | 11/1950 | Bell et al. | 60/226 R |
| 2,587,649 | 3/1952 | Pope | 60/39.16 R |
| 3,093,968 | 6/1963 | Osofsky | 60/39.17 X |
| 3,122,343 | 2/1964 | Leibach et al. | 244/23 B |
| 3,153,906 | 10/1964 | Marchant | 60/226 R |
| 3,191,886 | 6/1965 | Lewis et al. | 60/226 R |
| 3,318,095 | 5/1967 | Snell | 60/226 R |
| 3,385,065 | 5/1968 | Coplin | 60/226 R |
| 3,483,696 | 12/1969 | Gilbert et al. | 60/226 R |
| 3,489,338 | 1/1970 | Chilman | 60/226 R |

Primary Examiner—Carlton R. Croyle
Assistant Examiner—Robert E. Garrett
Attorney, Agent, or Firm—Craig & Antonelli

[57] ABSTRACT

A turbojet engine arrangement, especially for use with vertical or short take-off and landing airplanes of the type having jet deflector devices separate from the basic engine thrust nozzle for amplifying thrust and lift at least during take-off and landing of the airplane. The arrangement includes a low-pressure turbine arranged downstream of the exhaust gas stream of the basic engine which is connected to a low pressure compressor arranged upstream of the forward most compressor of the basic engine. Control flaps are provided in the exhaust gas stream for selectively directing the basic engine exhaust gas stream to and away from the low pressure turbine. At least a portion of the air outlet of the low pressure compressor is directed to said deflector devices for amplifying thrust and lift when the exhaust gas stream is in communication with the low pressure turbine. In order to minimize disruption of inlet air to the basic engine, the low pressure compressor blades are pivotable into a neutral position, or alternatively are arranged outwardly of the inlet to the basic engine at the ends of non-flow disrupting radially extending spokes. Additional heating means for heating the exhaust gases leading to the low pressure turbine may also be provided.

33 Claims, 3 Drawing Figures

PATENTED FEB 25 1975          3,867,813

TURBOJET ENGINE FOR VERTICAL OF SHORT TAKE-OFF AND LANDING AIRPLANES

BACKGROUND AND SUMMARY OF THE INVENTION

The present invention relates to a turbojet engine in a multiple-shaft and multiple-flow construction, preferably for vertical or short take-off and landing airplanes, wherein at least a portion of the air stream conveyed by a low-pressure blower and/or a low-pressure compressor of the jet engine can be fed to jet deflector devices.

It is a known fact that a considerably higher thrust demand must be met in airplanes equipped with turbojet engines for the take-off procedure, but especially for the short or vertical take-off, than is normally required for the cruising or horizontal flight of the airplane. Consequently, the turbojet engine or engines designed for short or vertical take-off must be throttled to a relatively large extent during cruising. Because of the basically different operating requirements at normal cruise and at take-off, it is very difficult to design an economical engine unit with optimum operating characteristics for both the high thrust demand take-off operation and the relatively lower thrust demand cruising operation, without taking considerable steps in control technology.

In multiple-shaft jet engines, for example in a double-flow construction, the known fact mentioned hereinabove thus has the effect that a relatively high bypass ratio is desired (e.g., with jet deflector devices exposed to bypass air) for the take-off procedure, especially the short or vertical take-off, with a view toward a specifically low fuel consumption and a relatively low jet velocity with resultant low noise level and minor ground erosions. In contrast thereto, a relatively low bypass ratio is desired during cruising.

It has also been contemplated, in order to increase the thrust requirement in single-cycle or multiple-cycle engines, to additionally heat the exhaust gases or at least a part of the bypass air stream and/or of the exhaust gas stream during a vertical or short take-off procedure. However, the thus-caused high fuel consumptions, high temperatures, high jet speeds and concomitant soil erosions are factors which, on the one hand, result in unreasonably high technical expenditure and, on the other hand, cannot as yet be fully controlled, at least at this time.

The present invention is directed to overcoming the above-mentioned problems by providing a multiple-cycle turbojet engine ensuring an optimum mode of operation for take-off, especially the short or vertical take-off of an airplane, as well as for cruising, without any appreciable expenditure with respect to control technology. Thus, in a relatively simple manner, an extremely high secondary flow or bypass ratio for take-off and a relatively low bypass ratio for cruising are to be ensured by the arrangement of the present invention.

In order to solve the above-mentioned problems, the present invention suggests primarily, in a turbojet engine according to the aforedescribed type, that a low-pressure system (low-pressure turbine and a low-pressure compressor connected therewith by way of a common shaft system) is driven, only during take-off or landing and/or for improving the lifting power of the airplane, by the exhaust gas stream of a single- or multiple-cycle basic engine, whereas, during cruising, the exhaust gas stream is shifted away from the low-pressure turbine and thus the low-pressure system is arrested.

According to the present invention, the above-mentioned reversal or shifting of the exhaust gas stream can suitably be effected by means of flaps which can be pivoted into the path of this stream.

Within the scope of a further embodiment of the present invention, the low-pressure compressor can exhibit adjustable guide vanes and/or rotor vanes which, when the low-pressure system is inoperative, can be pivoted into a neutral position having no appreciable effect on the flow.

In order to attain an extremely high bypass ratio and to cover an extremely high lifting thrust requirement, the invention proposes furthermore to connect devices upstream of the low-pressure turbine for additionally heating the exhaust gas stream conveyed by the basic engine.

According to a further embodiment contemplated by the present invention, at least one rotor of an auxiliary compressor pertaining to the above-mentioned selectively connectible low-pressure system can be formed essentially of spokes which do not appreciably impede the air feed to the multiple-cycle basic engine connected thereafter. These spokes, with blade-tip blower vanes disposed at their free ends, provide a compressor air feed, separate from the multiple-cycle basid engine, to additional lifting means, such as, for example, jet deflectors.

The above-discussed and other objects, features, and advantages of the present invention will become more apparent from the following detailed description thereof when taken in conjunction with the accompanying drawing, which shows, for purposes of illustration only, several embodiments in accordance with the present invention.

DETAILED DESCRIPTION OF THE DRAWINGS

Figure 1:
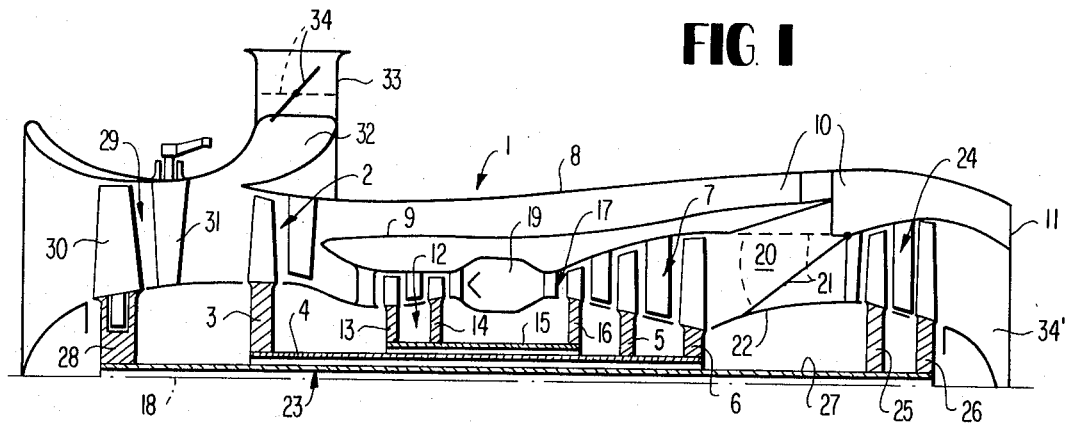
FIG. 1 is a partial schematic longitudinal sectional view showing the upper half of a first embodiment of a turbojet engine in accordance with the present invention.

In the embodiment of FIG. 1, the basic engine is denoted by 1 and is shown as a dual-shaft, dual-flow engine, consisting of a single-stage first compressor 2 with a relatively low pressure or compression ratio. The rotor 3 of compressor 2 is connected via a quill shaft 4 with the rotors 5, 6 of a two-stage turbine 7 of a likewise relatively low pressure ratio. During the operation of the basic engine 1, a portion of the air stream conveyed by the compressor 2 flows into an annular bypass duct 10 formed between an external housing jacket 8 and an internal housing jacket 9, and passes from there, for example for the production of propulsive thrust, via a nozzle 11 to the outside.

A remaining portion of the air stream conveyed by the first compressor 2 of the basic engine 1 is fed to a two-stage high-pressure compressor 12 connected, with the rotors 13, 14 via a further quill shaft 15 disposed coaxially with respect to the shaft 4, to the rotor 16 of a single-stage high-pressure turbine 17. The air stream, which is further compressed by the high-pressure compressor 12 is fed essentially to an annular combustion chamber 19 which in this embodiment is disposed, for example, coaxially to the longitudinal axis 18 of the engine. In this combustion chamber 19, the thus-fed compressor air is enriched with fuel and the thus-produced mixture is ignited, in order to drive, as a thermal gas, the high-pressure turbine 17 and during the course of further expansion of the thermal gases, also the two-stage turbine 7.

Downstream of an annular exhaust gas duct 20 connected after the turbine 7, one of several flaps 21 is illustrated which can be pivoted into or out of the stream of exhaust gas from the aforementioned basic engine 1. This flap 21, in accordance with the contour shown in full lines, can be pivoted, together with the remaining flaps which are not shown, in order to conduct the exhaust gas stream of the basic engine 1 into the annular duct 10 wherein an intermixing takes place of the exhaust gases with the bypass stream conveyed by the compressor 2 prior to exiting from the thrust nozzle 11 designed for cruising thrust.

The above-described basic concept of the basic engine 1, including the explained solid line position of the flaps 21, thus makes it possible to provide an engine arrangement which is optimal exclusively for cruising, with a desired, relatively low bypass ratio.

By pivoting the flaps 21 into the terminal position shown in dashed lines, the conveyance of the exhaust gas stream of the basic engine 1 into the annular duct 10 can be blocked and accordingly an additional low-pressure system 23 can be connected. This low-pressure system 23 is connected by placing a two-stage low-pressure turbine 24 downstream of the turbine 7 of the basic engine 1 and under the load of the exhaust gas stream of the basic engine 1 via the exhaust gas duct 20. The low-pressure turbine 24 is joined by the rotors 25, 26 via an internal shaft 27 to the rotor 28 of a single-stage blower and/or a single-stage low-pressure compressor 29. The rotor vanes 30 and guide vanes 31 are pivotably mounted for movement about respective axes extending radially from longitudinal axis 18. The vanes 30 and 31 are constructed so as to provide minimal resistance to the incoming air flow when pivoted to a non-operative position.

When the rotor vanes and guide vanes 30 and 31, respectively, of the low-pressure compressor 29 are pivoted into an operative conveying position and the flap 21 is in the position illustrated in dashed lines, the bypass ratio of the basic engine 1 is increased, for example, during take-off and for ascent, by feeding part of the air stream conveyed by the low-pressure compressor 29 via a ring-shaped compressor housing section 32 and an attached pipeline 33, for example, to one or several jet deflectors providing an additional lift for the airplane. Since jet deflectors of conventional construction may be arranged downstream of pipeline 33, details of such jet deflectors are not included herein. The exhaust gases conveyed by the low-pressure turbine 24 can also be fed, via the duct 34', to a jet deflector which is directed downwardly, for example, to increase the thrust. A blocking flap or throttle valve 34 is provided within the pipeline 33. This valve 34, with the low-pressure system 23 in operation, frees the path of compresssor air to the additional jet deflector lifting means, or blocks this path when the low-pressure system 23 is inoperative.

When the low-pressure system 23 is not in operation, it is furthermore provided to pivot the rotor and guide vanes 30, 31 of the low-pressure compressor into a neutral position wherein the flow to the basic engine 1 is not appreciably affected.

Interconnecting means for synchronizingly operating the flaps 21, valve 34, and pivot position of vanes 30 and 31 are also provided. Since interconnecting means of known construction could be used, such as for example, the interconnection of each of these devices to a common manually or automatically controlled switch for increased lift operation, details of specific interconnecting means are not included herein.

A further advantage of the FIG. 1 embodiment is that the diameter of the entire engine arrangement, in spite of the possibility of selectively adding the low-pressure system 23, does not deviate substantially from that of the basic engine 1. Further, in the interest of a head resistance or drag which is as low as possible, the flow from the low-pressure compressor 2 to the additional lifting means or jet deflector devices is branched off laterally, and the vane means of the compressors 29, 2 are disposed one behind the other in series connection.

Figure 2:
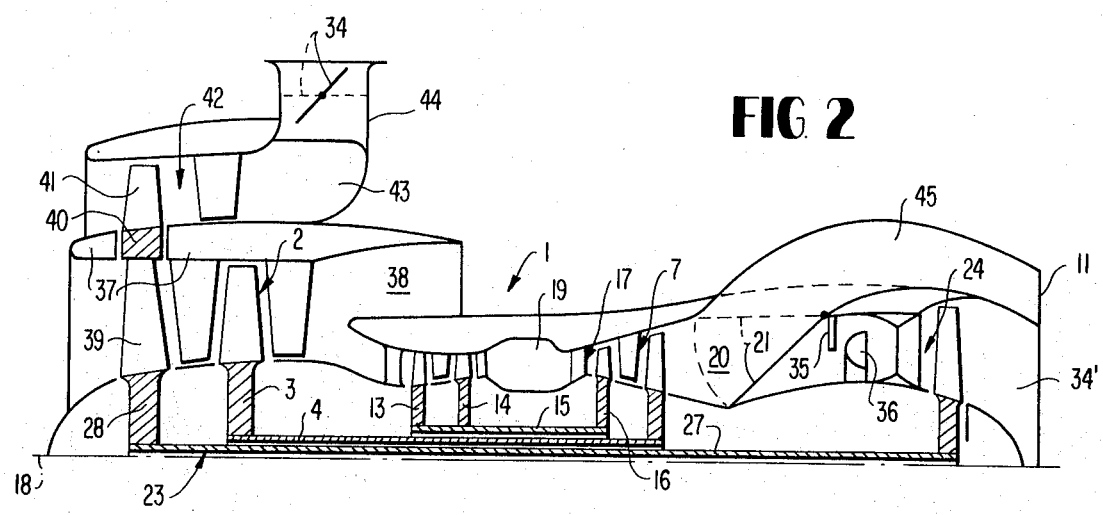
FIG. 2 is a partial schematic longitudinal sectional view showing the upper half of a second embodiment of a turbojet engine in accordance with the present invention.

FIG. 2 illustrates a modified embodiment of the present invention, in which identical reference numerals are used for elements with similar or substantially similar functions as corresponding elements of the FIG. 1 embodiment. The FIG. 2 embodiment differs from the FIG. 1 embodiment in that an additional heating of the exhaust gas stream conveyed by the basic engine 1 is provided for reinforcing the exhaust gas and blower thrust.

A fuel injection pipe 35 is provided in the exhaust gas duct 20, and a flame holder 36 is connected thereafter for providing additional heating of the exhaust gases leading to the low-pressure turbine 24. This additional heating further enhances the high thrust demand operations.

A further modification of the embodiment of FIG. 2 as compared to that of FIG. 1 resides in that the air stream conveyed by the compressor 2 of the basic engine 1 is not intermixed with the exhaust gases of the basic engine 1 prior to exiting from the thrust nozzle 11, but rather is exhausted to the outside directly, separately therefrom, via an annular duct 38 formed by a jacket housing 37, in order to produce propulsive thrust.

Another modification of the embodiment of FIG. 2 as compared to that of FIG. 1 is that the rotor 28 of the connectible low-pressure system 23 is equipped with spokes 39 connected in front of the compressor 2, rather than having adjustable rotor vanes. These spokes 39 are provided, via an annular shoulder 40 sealingly extendng through the jacket housing or shell 37 in a suitable manner, with blower vanes 41 of an additional single-stage axial-flow compressor 42. The compressor 42 powers, via an annular collecting chamber 43 and an adjoining pipeline 44, jet deflector means which are not illustrated in detail, for increasing the lift and/or in case of a V/STOL (vertical/short take-off and landing) operation of the airplane when the pressure system 23 is connected.

The exhaust gases conveyed by the turbine 24 of FIG. 2, which, in this case, is of a single-stage structure, for example, can likewise be fed, in turn, to a suitable jet deflector device as a take-off aid or for the vertical or short take-off operation, via the duct 34' when the low-pressure system 23 is in operation.

In contrast to FIG. 1, the exhaust gas duct 20 of the basic engine 1 is continued, in FIG. 2, in a duct 45 surrounding the low-pressure turbine 25 in an arcuate manner. When the low-pressure system 23 is not turned on (cruising flight), the exhaust gases of the basic engine 1 are exhausted via this duct 45 by way of the separate, annular thrust nozzle 11.

In a further exemplary modification as compared to the embodiment of FIG. 1, FIG. 2 also illustrates the turbine 7 as being only a single-stage unit.

Figure 3:
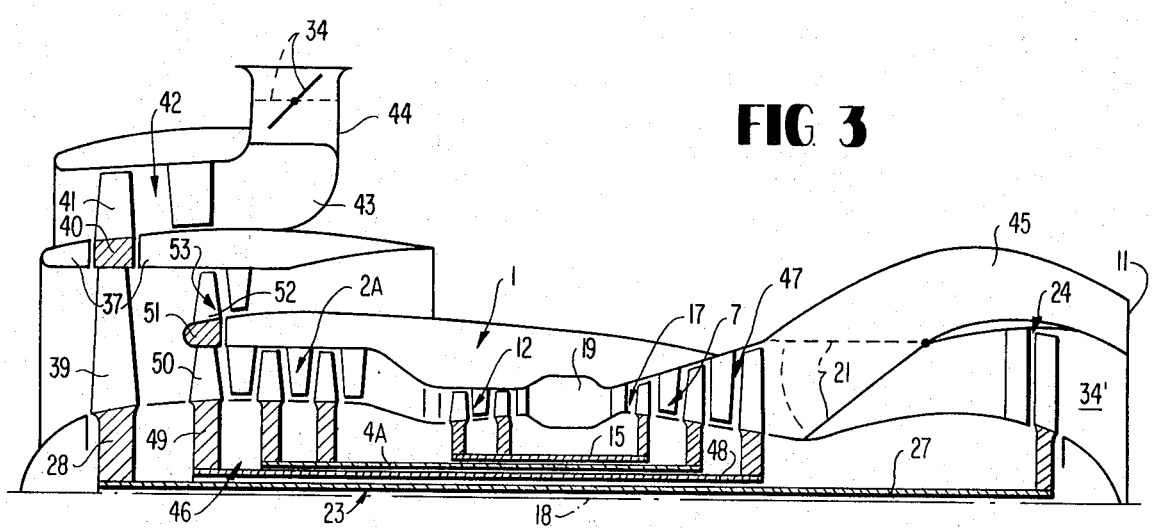
FIG. 3 is a partial schematic longitudinal sectional view showing the upper half of a third embodiment of a turbojet engine in accordance with the present invention.

The turbojet engine according to FIG. 3 differs, with the use of identical reference numerals for the same or similar parts, from the engine of FIG. 2 mainly by the addition of a further compressor/turbine system 46 to the basic engine 1. In this connection, the turbine 47 under the load of the exhaust gases of turbine 7 is connected, via a quill shaft 48 surrounding the inner shaft 27 of the connectible low-pressure system 23, with a compressor rotor 49 (compressor rotor 49 is comparable in function to compressor 2 of the FIG. 1 and 2 embodiments insofar as supply of air to the bypass duct of the basic engine is concerned). Compressor rotor 49 exhibits spokes 50 which do not appreciably impede the air feed to the compressor 2A connected thereafter. The blower rotor vanes 52 of a single-stage auxiliary compressor 53 are mounted to these spokes 50, with the interposition of an aerodynamically profiled supporting ring 51, for the constant production of propulsive thrust.

In contradistinction to the compressor 2 of the embodiment of FIG. 2A, the compressor 2 in FIG. 3 is exclusively a preliminary compressor of the high-pressure compressor 12. With respect to the selective possibility of connecting the low-pressure system 23, the arrangement and mode of operation of the jet engine of FIG. 3 are identical to that of FIG. 2.

Furthermore, in the jet engine of FIG. 3, there is no provision shown for a device for the additional heating of the exhaust gases of the basic engine 1.

While I have shown and described but several embodiments in accordance with the present invention, it is to be understood that the same is not limited thereto but is susceptible of numerous changes and modifications as known to those skilled in the art, and I therefore do not wish to be limited to the details shown and described herein but intend to cover all such changes and modifications as are within the scope of those skilled in the art. For example, the heating means such as shown at 35, 36 in FIG. 2 could be utilized in the FIG. 1 and FIG. 3 embodiments.

I claim:

1. A turbojet engine arrangement; especially for use with vertical or short take-off and landing airplanes of the type having jet deflector devices separate from the thrust nozzle of the basic engine for amplifying thrust and lift at least during take-off and landing of the airplane; said arrangement comprising: a basic turbojet engine for supplying an exhaust gas stream, a propulsive thrust nozzle arranged downstream of said exhaust gas stream, a first low-pressure turbine arranged downstream of said exhaust gas stream, a first low-pressure compressor drivingly connected to said low-pressure turbine by a first shaft, said first low-pressure compressor rotating coaxially with said first shaft, said first low-pressure compressor supplying a first low pressure air stream output in response to rotation of said low-pressure turbine, duct means for communicating at least a portion of said first low-pressure airstream output to jet deflector devices, and exhaust gas stream control means for selectively communicating said exhaust gas stream with one of said first low-pressure turbine and said propulsive thrust nozzle,
   wherein said basic engine includes a combustion chamber, basic engine compressor means for supplying compressed air to said combustion chamber and to a bypass duct extending in bypassing relationship to said combustion chamber and separate from said duct means, basic engine turbine means driven by an exhaust gas stream from said combustion chamber and drivingly connected by basic engine shaft means to said basic engine compressor means,
   wherein said basic engine shaft means are coaxial with said first shaft,
   and wherein said exhaust gas stream control means is arranged downstream of said basic engine turbine means and upstream of said first low-pressure turbine means such that said engine arrangement is operable with a relatively high bypass ratio for take-off and landing operations when said exhaust gas stream is communicated with said first low-pressure turbine means and is operable with a relatively low bypass ratio for cruise conditions when said exhaust gas stream is communicated with said propulsion thrust nozzle.

2. An arrangement according to claim 1, wherein said exhaust gas stream control means includes means for completely closing off said exhaust gas stream from said first low-pressure turbine, whereby said first low-pressure turbine and compressor can be rendered inoperative for normal cruising flight use of the engine arrangement.

3. An arrangement according to claim 1, wherein said exhaust gas stream control means includes means for completely closing off said exhaust gas stream from said first low-pressure turbine, whereby said first low-pressure turbine and compressor can be rendered inoperative for normal cruising flight use of the engine arrangement.

4. An arrangement according to claim 3, wherein said first low-pressure turbine is positioned rearwardly of said second turbine, and wherein said first low-pressure compressor is positioned forwardly of said second compressor.

5. An arrangement according to claim 2, wherein said exhaust gas stream control means includes at least one flap means pivotable about an axis extending perpendicular to the flow of the exhaust gas stream.

6. An arrangement according to claim 5, wherein said exhaust gas stream is annular shaped and surrounds a longitudinally extending axis of the basic engine, and wherein a plurality of flap means are included which are pivotable about respective axes extending perpendicular to the flow of the exhaust gas stream.

7. An arrangement according to claim 3, wherein said exhaust gas stream control means includes at least one flap means pivotable about an axis extending perpendicular to the flow of the exhaust gas stream.

8. An arrangement according to claim 1, further comprising heating means for heating the exhaust gas stream after said exhaust gas stream leaves the basic engine and before said exhaust gas stream reaches said first low-pressure turbine.

9. An arrangement according to claim 8, wherein said heating means is arranged downstream of said exhaust gas stream control means, whereby the exhaust gas stream supplied to said thrust nozzle is unaffected by said heating means.

10. An arrangement according to claim 3, further comprising heating means for heating the exhaust gas stream after said exhaust gas stream leaves the basic engine and before said exhaust gas stream reaches said first low-pressure turbine.

11. An arrangement according to claim 10, wherein said heating means is arranged downstream of said exhaust gas stream control means, whereby the exhaust gas stream supplied to said thrust nozzle is unaffected by said heating means.

12. An arrangement according to claim 1, wherein said first low-pressure compressor is positioned upstream of said basic engine compressor means, said first low-pressure compressor including a plurality of compressor rotor vanes extending radially outwardly of an air inlet opening to said basic engine compressor means, said rotor vanes being attached to said first shaft by spokes extending across said air inlet opening, said spokes being constructed of streamlined cross-sectional shape so as to minimize the disturbance of air flowing in said air inlet.

13. An arrangement according to claim 12, wherein said compressor rotor vanes extend into an annular compressor space arranged upstream of said duct means in surrounding engagement with respect to said air inlet opening.

14. An arrangement according to claim 1, wherein said basic engine compressor means includes: a high pressure compressor having rotating high pressure compressor blades immediately upstream of an air inlet to said combustion chamber, said high pressure compressor blades being drivingly connected to a set of high pressure turbine blades arranged immediately downstream of said combustion chamber by a high pressure shaft forming part of said basic engine shaft means, and a second low-pressure compressor having rotating low-pressure compressor blades arranged upstream of said high pressure compressor blades, said second low-pressure compressor being drivingly connected to a second low-pressure turbine having rotating low-pressure turbine blades arranged downstream of said high pressure compressor blades by a second shaft forming part of said basic engine shaft means.

15. An arrangement according to claim 14, wherein said exhaust gas stream control means includes means for completely closing off said exhaust gas stream from said first low-pressure turbine, whereby said first low-pressure turbine and compressor can be rendered inoperative for normal cruising flight use of the engine arrangement.

16. An arrangement according to claim 14, wherein said basic engine compressor means includes a third low-pressure compressor drivingly connected to a third low-pressure turbine by a third shaft forming part of said basic engine shaft means, said third shaft being coaxial with said other shaft said third low-pressure compressor having a set of low-pressure compressor blades positioned upstream of the low-pressure compressor blades of said second low-pressure compressor, said third low-pressure turbine having a set of low-pressure turbine blades positioned downstream of the low-pressure turbine blades of said second low-pressure turbine.

17. An arrangement according to claim 16, wherein said exhaust gas stream control means includes means for completely closing off said exhaust gas stream from said first low-pressure turbine, whereby said first low-pressure turbine and compressor can be rendered inoperative for normal cruising flight use of the engine arrangement.

18. An arrangement according to claim 17, wherein all of the air leaving said second low-pressure compressor is supplied to said high pressure compressor.

19. An arrangement according to claim 18, wherein the air leaving said third low-pressure compressor is supplied to a second thrust nozzle separate from said first-mentioned thrust nozzle in bypassing relationship to said combustion chamber.

20. An arrangement according to claim 19, wherein flap means are provided in said duct means for selectively closing said duct means with respect to said first low-pressure compressor when said control means is in a position completely closing off said exhaust gas stream with respect to said first low-pressure turbine.

21. An arrangement according to claim 15, wherein said first and second shafts and said high pressure shaft all rotate about a common longitudinally extending axis and are concentric with respect to one another.

22. An arrangement according to claim 21 further comprising a second thrust nozzle annularly disposed about the forward portion of the basic engine and in communication with a portion of the outlet air from said second low-pressure compressor.

23. An arrangement according to claim 22, wherein flap means are provided in said duct means for selectively closing said duct means with respect to said first low-pressure compressor when said control means is in a position completely closing off said exhaust gas stream with respect to said first low-pressure turbine.

24. An arrangement according to claim 22, further comprising a third thrust nozzle communicating with the exhaust of said first low-pressure turbine.

25. An arrangement according to claim 2, wherein flap means are provided in said duct means for selectively closing said duct means with respect to said first low-pressure compressor when said control means is in a position completely closing off said exhaust gas stream with respect to said first low-pressure turbine.

26. An arrangement according to claim 14, wherein a further thrust nozzle is positioned in the exhaust air flowing from said first low-pressure turbine.

27. An arrangement according to claim 1, wherein said duct means extend laterally in a radial direction with respect to the axis of rotation of said first low-pressure compressor.

28. An arrangement according to claim 14, wherein said second low-pressure compressor supplies compressed air to said high-pressure compressor and to said bypass duct.

29. An arrangement according to claim 16, wherein said second low-pressure compressor supplies compressed air only to said high pressure compressor, and wherein said third low-pressure compressor supplies air only to said bypass duct, said third low-pressure compressor including compressor blades having spokes extending radially across the inlet to said second low-pressure compressor and compressor vanes at the radial outer ends of said spokes.

30. An arrangement according to claim 29, wherein said first low-pressure compressor includes spokes extending radially across the inlet to said third low-pressure compressor and compressor vanes at the radial outer ends of said spokes, said last-mentioned compressor vanes being disposed at the inlet to said duct means leading to said jet deflector devices, the spokes of both the first and second low-pressure compressors being constructed of streamlined cross-sectional shape so as to minimize disturbance of air flow thereby.

31. An arrangement according to claim 30, wherein said shafts are hollow concentric shafts with said first shaft being disposed inside the other shafts.

32. An arrangement according to claim 31, wherein said bypass duct concentrically surrounds said second low pressure compressor and opens to the outside separately from said propulsion thrust nozzle.

33. An arrangement according to claim 32, wherein said exhaust gas stream control means includes means for completely closing off said exhaust gas stream from said first low-pressure turbine, whereby said first low-pressure turbine and compressor can be rendered inoperative for normal cruising flight use of the engine arrangement.

* * * * *